(12) United States Patent
David et al.

(10) Patent No.: US 7,584,766 B2
(45) Date of Patent: Sep. 8, 2009

(54) OVERFILL PREVENTION VALVE FOR SHALLOW TANKS

(75) Inventors: Donald R. David, Raytown, MO (US); Ronald W. Borst, Kansas City, MO (US)

(73) Assignee: Clay and Bailey Manufacturing Company, Kansas City, MO (US)

( * ) Notice: Subject to any disclaimer, the term of this patent is extended or adjusted under 35 U.S.C. 154(b) by 304 days.

(21) Appl. No.: 11/369,253

(22) Filed: Mar. 7, 2006

(65) Prior Publication Data

US 2007/0209713 A1    Sep. 13, 2007

(51) Int. Cl.
F16K 31/18    (2006.01)
(52) U.S. Cl. .................. 137/413; 137/433; 141/198
(58) Field of Classification Search ......... 137/412–414, 137/423, 429, 430, 432, 433; 141/98, 95, 141/141, 198
See application file for complete search history.

(56) References Cited

U.S. PATENT DOCUMENTS

| | | | | | |
|---|---|---|---|---|---|
| 1,313,029 | A | * | 8/1919 | Storr | 137/422 |
| 1,648,047 | A | * | 11/1927 | Giesler | 137/202 |
| 2,316,000 | A | * | 4/1943 | James | 137/414 |
| 2,616,450 | A | * | 11/1952 | Legge et al. | 137/413 |
| 2,771,090 | A | * | 11/1956 | Smith et al. | 137/412 |
| 3,205,908 | A | * | 9/1965 | Sperlich | 137/413 |
| 3,929,155 | A | * | 12/1975 | Garretson | 137/430 |
| 4,305,422 | A | * | 12/1981 | Bannink | 137/415 |
| 4,313,459 | A | * | 2/1982 | Mylander | 137/416 |
| 4,444,230 | A | * | 4/1984 | Van Mullem | 137/415 |
| 5,152,315 | A | | 10/1992 | Lagache | |
| 5,235,999 | A | * | 8/1993 | Lindquist et al. | 137/15.01 |
| 5,241,983 | A | | 9/1993 | Lagache | |
| 5,398,735 | A | | 3/1995 | Lagache | |
| 5,655,565 | A | * | 8/1997 | Phillips et al. | 137/413 |
| 5,787,942 | A | * | 8/1998 | Preston et al. | 137/427 |

(Continued)

FOREIGN PATENT DOCUMENTS

FR    2476790 A  *  2/1980

(Continued)

OTHER PUBLICATIONS

Declaration of Bradford E. Holmes dated Jun. 2, 2008 and Exhibits 1, 2, and 3.

*Primary Examiner*—John Rivell
*Assistant Examiner*—Craig Price
(74) *Attorney, Agent, or Firm*—Hovey Williams LLP

(57) ABSTRACT

An overfill prevention valve for mounting on the filling inlet of a liquid storage tank has an elongated, tubular valve body provided with an inlet at one end and one or more outlets in the sidewall thereof. A pressure-actuated piston is moveable between an open position spaced below an annular valve seat between the inlet and outlets and a closed position engaging the valve seat to close the outlet. An orifice in the top of the piston communicates with an actuating chamber on the opposite side of the piston so that a measure of piloting liquid flows into the chamber and out a pilot hole at the bottom of the valve body during normal filling operations. A buoyant float is slidable along a hollow guide tube attached to the bottom of valve body and communicates with the pilot port for closing a discharge hole in the guide tube when the float rises to an upwardly buoyed position due to the liquid in the tank reaching a predetermined maximum level. Such closure of the discharge hole causes the pressure within the chamber to rise, shifting the piston to its upper, closed position against the valve seat, thereby closing the outlets and terminating further flow into the tank.

16 Claims, 3 Drawing Sheets

U.S. PATENT DOCUMENTS 5,829,465 A * 11/1998 Garretson ................... 137/413
5,832,953 A    11/1998 Lattner et al.
6,206,056 B1   3/2001 Lagache
6,230,730 B1 * 5/2001 Garretson ...................... 137/2
6,318,421 B1   11/2001 Lagache
6,536,465 B2   3/2003 David et al.

FOREIGN PATENT DOCUMENTS

FR          2476790      8/1981

* cited by examiner

OVERFILL PREVENTION VALVE FOR SHALLOW TANKS

TECHNICAL FIELD

This invention relates to liquid control devices and, more particularly, to a valve that can be installed at the filling inlet of a liquid storage tank, such as a shallow tank used to hold home heating oil or diesel fuel for backup generators, to prevent overfilling of the tank.

BACKGROUND

Fuel storage tanks of the foregoing type are typically filled from a tank truck by means of a hose that is coupled with an inlet pipe or fitting on the tank. Fuel from the truck is typically pumped into the tank at relatively substantial pressures. Although the pumps are typically operable to shift into a by-pass mode when the pump senses by back-pressure that the tank is full, it is often desirable to stop the fill cycle before the pump goes into by-pass. For example, in some instances the fuel may start spilling out a vent on the tank if the operator waits for the pump to stop the flow. At the same time, however, it is desirable to fill the tank as full as possible, for a number of reasons.

Various types of overfill preventing valves are known in the art. However, not all are readily installable through narrow fittings or inlet pipes on pre-existing tanks. Moreover, not all are simple, effective and reliable.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
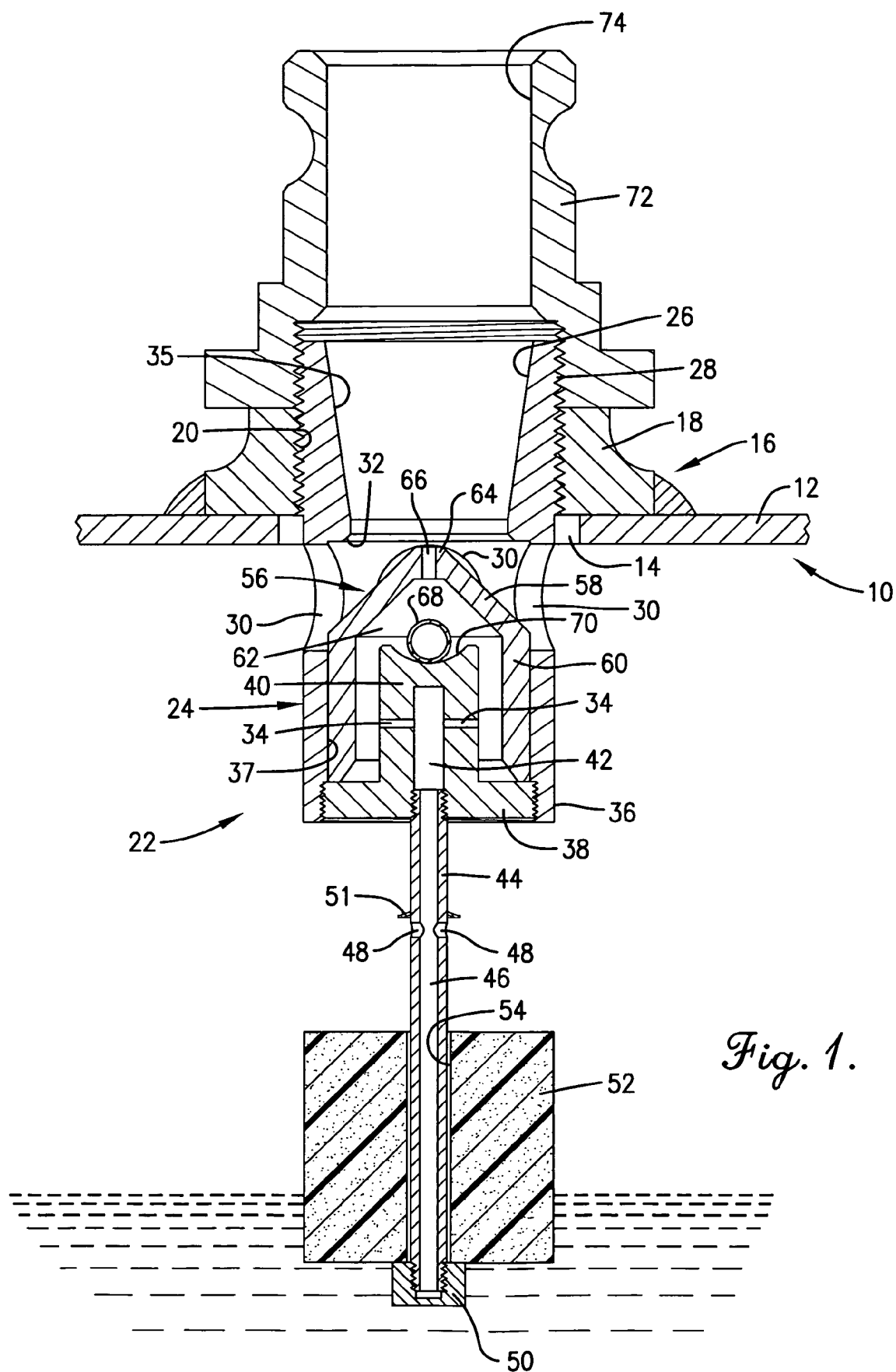
FIG. 1 is a fragmentary vertical cross-sectional view through a liquid storage tank showing an overfill prevention valve in accordance with the present invention installed in an inlet opening in the top wall of the tank, the piston of the valve being shown in its open position.
Figure 2:
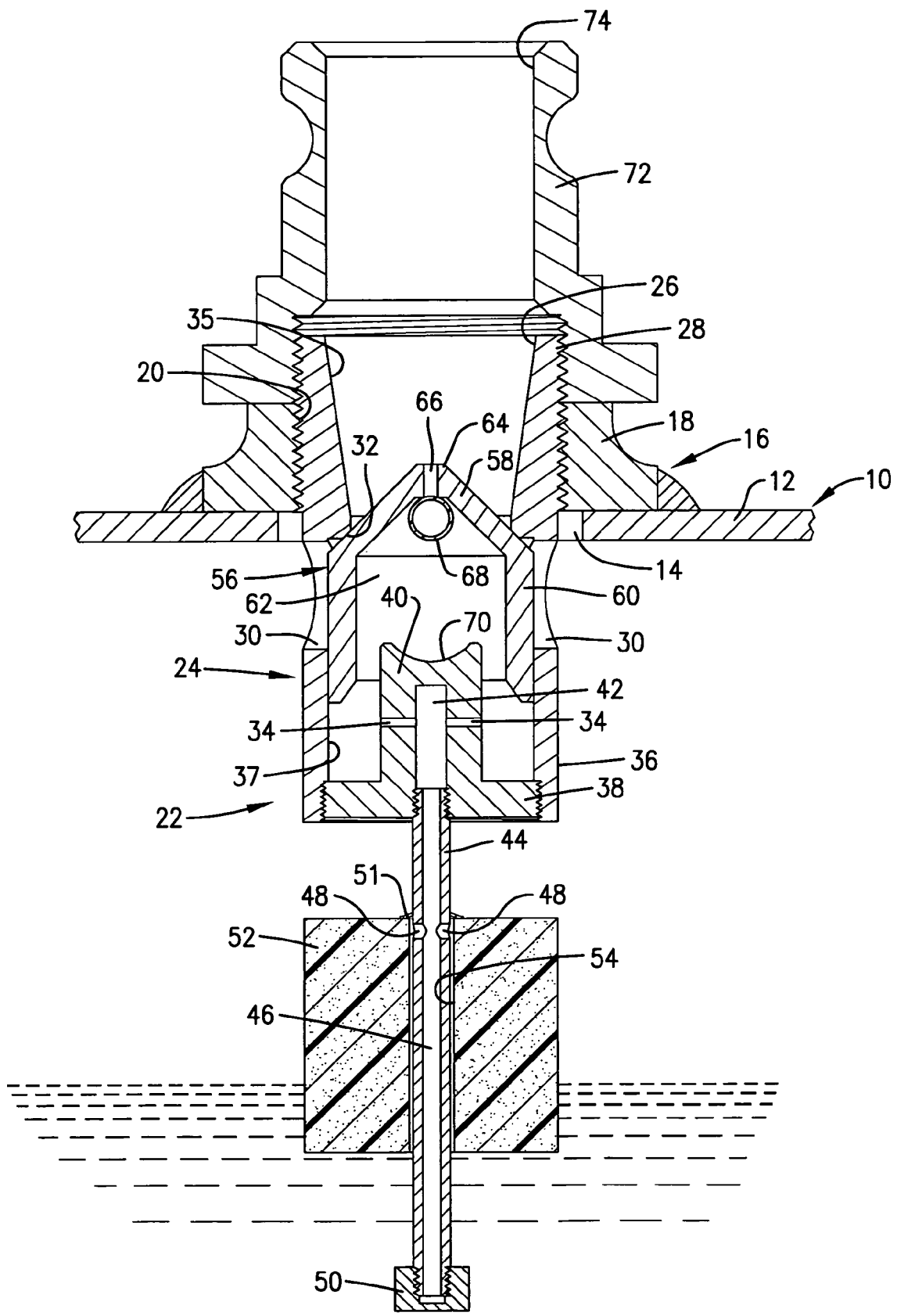
FIG. 2 is a fragmentary cross-sectional view similar to FIG. 1 but showing the piston in its closed position.

FIGS. 1 and 2 show a tank 10 having a top wall 12 in which is disposed an inlet opening 14 that provides access to the interior of tank 10. Valve mounting structure broadly denoted by the numeral 16 comprises an annular flange 18 having an internally threaded bore 20 that is axially aligned with opening 14. Flange 18 overlies wall 12 and is fixed thereto such as by welding.

An overfill prevention valve broadly denoted by the numeral 22 is supported by flange 18 and projects downwardly into the interior of tank 10 through opening 14. Valve 22 includes an elongated, hollow valve body 24 having an inlet 26 at the upper end 28 thereof, at least one, and preferably four, outlets 30 in the sidewall of body 24 downstream from inlet 26, an annular valve seat 32 between inlet 26 and outlets 30, and a pair of diametrically opposed, transversely extending pilot ports 34 adjacent the lower end 36 of body 24. An upper bore 35 extends axially from inlet 26 to seat 32 and tapers toward a reduced diameter as seat 32 is approached. A lower bore 37 of constant diameter extends axially from seat 32 to lower end 36 and is somewhat larger in diameter than upper bore 35 at seat 32.

Lower end 36 of valve body 24 is closed by virtue of a plug 38 that is externally threaded so as to be threadably received by internal threads on the lower end of lower bore 37. Plug 38 has a centrally disposed, cylindrical riser 40 spaced radially inwardly from adjacent wall portions of valve body 24 and having the pilot ports 34 located therein.

Riser 40 has an axially extending bore 42 that intersects transverse pilot ports 34 and extends downwardly therefrom through the bottom of plug 38. The lower portion of bore 42 is internally threaded and securely receives the upper externally threaded end of a guide tube 44 projecting downwardly from plug 38. Guide tube 44 defines an internal passage 46 communicating with bore 42 of riser 40. A pair of diametrically opposed, transversely extending discharge holes 48 are provided in the sidewall of guide tube 44 at a location between the bottom of valve body 24 and the lower end of guide tube 44 in communication with passage 46.

The lower end of guide tube 44 is closed by a threaded cap 50 which also serves as a lower limit stop for a cylindrical float 52 shiftably mounted on guide tube 44 for vertical movement along the latter between a lower position as illustrated in FIG. 1 and a raised position as illustrated in FIG. 2. An upper limit stop 51 in the form of a press nut or tinnerman, for example, may be provided on guide tube 44 above holes 48 to engage the top of float 52 and limit its upward movement after holes 48 have been covered. Guide tube 44 and float 52 comprise further components of valve 22.

Float 52 has an axially extending bore 54 extending the full length thereof through which guide tube 44 extends. Bore 54 is of sufficiently large diameter to permit float 52 to easily slip along the length of guide tube 44 between its two extreme positions. It will be noted that in the lower position of FIG. 1, float 52 uncovers and clears discharge holes 48, while in the upwardly buoyed position of FIG. 2, float 52 covers discharge holes 48.

Valve 22 further includes a hollow piston 56 that is shiftably received within lower bore 37 in sliding, sealing engagement with the internal sidewall surfaces thereof. Piston 56 has a conical nose 58 facing in the upstream direction and an annular skirt 60 integral with and extending downwardly from the lower extremity of nose cone 58. The interior of piston 56 thus cooperates with the lower end 36 of valve body 24, particularly plug 38 with its riser 40, in defining an expandable actuating chamber 62 whose dimensions depend upon the vertical position of piston 56 within lower bore 37. In this respect, it will be noted that piston 56 is shiftable vertically within lower bore 37 between an open position as illustrated in FIG. 1 wherein the piston is spaced away from seat 32 and a closed position as illustrated in FIG. 2 wherein the external surface of nose cone 58 makes sealing engagement with seat 32. When piston 56 is in its open position of FIG. 1, outlets 30 are uncovered and in communication with inlet 26, while when piston 56 is in its closed position of FIG. 2, outlets 30 are covered by skirt 60 of piston 56, blocking communication between inlet 26 and outlets 30.

Nose cone 58 is slightly truncated, presenting a flat, uppermost tip 64. An orifice 66 located at tip 64 communicates upper bore 35 with chamber 62. A buoyant ball 68, preferably but not necessarily hollow, is located within actuating chamber 62 and normally rests upon a shallow dished recess 70 in the upper end of riser 40. The diameter of ball 60 is such that it cannot escape from chamber 62 through the annular area defined between skirt 60 and riser 40. However, ball 68 is free to move buoyantly between recess 70 as shown in FIG. 1 and the bottom edge of orifice 66 as shown in FIG. 2 to close orifice 66.

The upper end 28 of valve body 24 projects upwardly through and beyond flange 18. This provides a means by which an internally threaded coupling neck 72 may be threaded onto valve body 24. Coupling neck 72 is adapted to receive a mating coupler on the end of a supply hose (not shown) from the tank truck and has an internal, axially extending bore 74 that communicates with inlet 26 of valve body 24.

Pilot ports 34 are substantially smaller than orifice 66, guide tube passage 46, and discharge holes 48. In one preferred embodiment, the combined cross-sectional area of pilot ports 34 is approximately ½ the cross-sectional area of orifice 66, approximately ¼ the cross-sectional area of passage 46, and approximately ¼ the combined cross-sectional area of discharge holes 48.

Operation

Valve 22 is in the condition illustrated in FIG. 1 just prior to the refilling of tank 10. In this condition, piston 56 is in its open position spaced downwardly from valve seat 32, ball 68 is resting upon the floor of recess 70, and float 52 is in its lowered position uncovering discharge holes 48. Thus, when a delivery hose is connected to coupling neck 72 and liquid is pumped under pressure through the hose and into neck 72, the liquid is free to flow through valve body 24 and out outlets 30 into the interior of tank 10. The sloping conical surface of nose cone 58 of piston 56 is helpful in directing the incoming liquid toward outlets 30 at this time.

As liquid is flowing through outlets 30 into the tank 10, a piloting stream of liquid also passes through orifice 66 and into chamber 62. However, such piloting liquid immediately leaves chamber 62 via pilot ports 34, bore 42, passage 46 in tubular member 44, and discharge holes 48. Thus, the pressure within chamber 62 is no higher than that of the main incoming flow through outlets 30. Consequently, piston 56 remains in its open position of FIG. 1.

As the liquid level within tank 10 approaches a predetermined maximum, float 52 is progressively buoyed up along guide tube 44 until the maximum liquid level is reached, at which time float 52 will completely cover discharge holes 48 as illustrated in FIG. 2. Such covering of discharge holes 48 by float 52 causes the pressure to rise within chamber 62 until it becomes sufficient to overcome the opposing pressure of the inflowing liquid through outlets 30. At that point, the increased pressure within chamber 62 causes piston 56 to rise up into sealing engagement with seat 32, thereby effectively closing outlets 30 and preventing further inflow into tank 10. If the pump on the tank truck is provided with a by-pass valve, the back pressure created within the hose when piston 56 closes outlets 30 triggers the pump to shift into its by-pass mode. When the operator detects that the pump is in its by-pass mode, he can then turn off the pump.

The buoyancy of ball 68 keeps it seated up against the bottom of orifice 66 when chamber 62 is filled with piloting liquid and piston 56 is in its closed position. This prevents the pressurized pilot liquid within chamber 62 from squirting upwardly through orifice 66 and relieving pressure within chamber 62 sufficiently to allow piston 56 to drop down to its opened position of FIG. 1. If piston 56 were to drop, chamber 62 would once again become filled with pressurized liquid from upper bore 35, causing the piston 56 to then rise back into engagement with seat 32, and then fall and rise again and again in repeated, undesirable cycling actions.

Once the operator turns off the pump at the tank truck, the pressure within upper bore 35 falls, although there is still a head of liquid within the supply hose, coupling neck and upper bore 35. The piloting liquid within chamber 62 slowly bleeds out of that area via the discharge holes 48 and the clearance space between float 52 and the exterior of guide tube 44. As this happens, piston 56 descends within valve body 24, reopening outlets 30 and allowing the trapped head of liquid within the delivery line to drain therefrom into tank 10 until the line and all areas above valve 56 have been emptied.

Depending upon a number of factors, it may be desirable to have valve 22 shut off when the liquid level in tank 10 is lower than that illustrated in FIG. 2. For example, governing bodies in different parts of the country may have different standards as to the maximum percentage of the tank volume that can be filled with liquid. The shapes of tanks can vary significantly such that the same maximum fill percentage could result in a liquid level that is spaced further below the top wall 12 in one tank than in another differently shaped tank. In order to achieve lower shut off, the upper threaded end 28 of valve body 24 above outlets 30 could be lengthened so as to increase the overall length of valve body 24 without adversely affecting the relationship between piston 56 and outlets 30. Another approach would be to lengthen guide tube 44 in the area above holes 48 so as to dispose float 52 deeper into the tank without adversely affecting the relationship between float 52 and outlets 48. If the maximum liquid level in the tank can be higher than that illustrated in FIG. 2, the portion of tube 44 above holes 48 could be shortened and the stop 51 eliminated. The bottom of valve body 24 may or may not serve as the upper limit of travel of float 52 in that instance.

ALTERNATIVE EMBODIMENT

Figure 3:
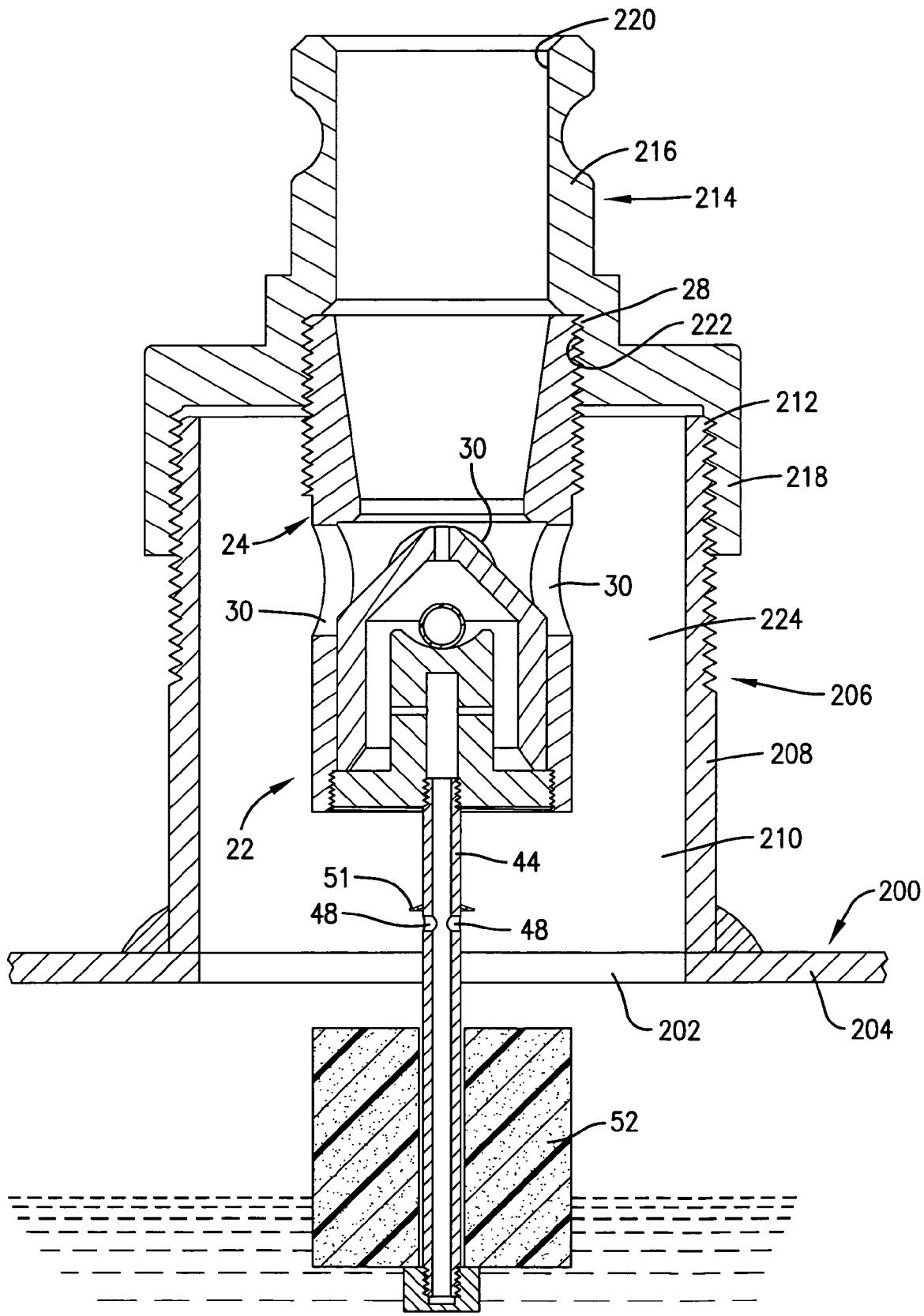
FIG. 3 is a fragmentary vertical cross-sectional view of the overfill prevention valve of FIGS. 1 and 2 installed within a larger diameter inlet fitting of a liquid storage tank.

In the alternative embodiment of FIG. 3, overfill prevention valve 22 is installed within a tank 200 having an inlet opening 202 in top wall 204 that is substantially larger in diameter than inlet opening 14 of the first embodiment. Thus, while valve 22 in FIG. 3 is identical to that previously described, the mounting structure 206 for supporting valve 22 on tank 200 is different.

In this regard, instead of a flange 18, mounting structure 206 includes an upstanding tubular fitting 208 that overlies opening 202 and has a passage 210 in axial alignment therewith. Fitting 208 has an externally threaded upper end 212.

Mounting structure 206 further includes a coupling neck 214 having an upright tubular portion 216 and an enlarged, annular skirt portion 218 fixed to the lower end of tubular portion 216 and projecting downwardly therefrom. Skirt portion 218 is internally threaded so as to threadably receive the externally threaded upper end 212 of fitting 208.

Tubular portion 216 includes a smooth-walled, upper bore 220, as well as a slightly enlarged, internally threaded lower bore 222. The externally threaded upper end 28 of valve 22 is threadably received by bore 222 so as to support valve 22 in depending relationship from coupling neck 214.

The valve body 24 is smaller in diameter than passage 210 within fitting 208. Thus, coupling neck 214 supports valve 22 in such a way that body 24 thereof projects downwardly into passage 210 in radially spaced relation to the interior surface of fitting 208. Consequently, an annular space 224 is defined within passage 210 between valve body 24 and fitting 208. Guide tube 44 and float 52 project down through opening 202 and into the interior of tank 200.

Valve 22 in FIG. 3 in conjunction with the larger diameter hole 202 operates in the same manner as in the first embodiment with respect to the smaller opening 14. However, it will be appreciated that with the arrangement of FIG. 3, liquid exiting through the outlets 30 enters the annular space 224 and passage 210 above the top wall 204 of tank 200 before gravitating through opening 202 and into the interior of the tank. This arrangement also enables the tank to be filled to a higher level than in the first embodiment inasmuch as valve 22 is supported in a higher position on tank 200. Guide tube 44 and float 52 are still disposed within the interior of tank 200, but the entirety of valve body 24 is located above opening 202.

It is contemplated that in one commercial form of the invention, coupling neck 214 and valve 22 will be supplied as a preassembled unit. Such unit can then be simply threaded onto the fitting 208 of a preexisting tank 200.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. An overfill prevention valve for mounting on a liquid storage tank comprising:
    an elongated hollow valve body having an inlet at one end adapted for connection to a source of supply of liquid under pressure for filling the tank, at least one laterally disposed outlet downstream from said inlet for delivering liquid into the tank from the body, a valve seat between the inlet and the outlet, and a pilot port at an opposite end of the body;
    a piston axially movable within said body between an open position wherein the piston is spaced away from said seat to permit incoming liquid to flow through the outlet and into the tank and a closed position wherein the piston is sealingly engaged with said seat to prevent liquid flow through the outlet and into the tank,
    said piston cooperating with said opposite end of the body to define an expandable actuating chamber that communicates with said pilot port,
    said piston having an orifice disposed for communicating the chamber with the inlet so that the chamber receives piloting liquid from the flow entering the body;
    a guide tube fixed to and projecting downwardly from said opposite end of the body and communicating with said pilot port,
    said guide tube having a discharge hole at a location spaced below the body for permitting piloting liquid to escape from the chamber into the tank via the pilot port, the guide tube, and the discharge hole; and
    a float buoyantly shiftable along and relative to said tube between a lower position uncovering said discharge hole when liquid within the tank is below a predetermined maximum level and an upwardly buoyed position covering said discharge hole when liquid reaches said predetermined maximum level,
    said float being adapted when in said upwardly buoyed position for causing piloting liquid pressure to increase in the chamber and shift the piston from the open position to the closed position.

2. An overfill prevention valve as claimed in claim 1,
    said piston having a generally tapered nose facing in the upstream direction,
    said nose being disposed to engage said seat when the piston is in the closed position and to direct liquid toward said outlet when the piston is in the open position.

3. An overfill prevention valve as claimed in claim 2,
    said nose having an uppermost, central tip,
    said orifice being disposed at said tip.

4. An overfill prevention valve for mounting on a liquid storage tank comprising:
    an elongated hollow valve body having an inlet at one end adapted for connection to a source of supply of liquid under pressure for filling the tank, at least one laterally disposed outlet downstream from said inlet for delivering liquid into the tank from the body, a valve seat between the inlet and the outlet, and a pilot port at an opposite end of the body;
    a piston axially movable within said body between an open position wherein the piston is spaced away from said seat to permit incoming liquid to flow through the outlet and into the tank and a closed position wherein the piston is sealingly engaged with said seat to prevent liquid flow through the outlet and into the tank,
    said piston cooperating with said opposite end of the body to define an expandable actuating chamber that communicates with said pilot port,
    said piston having an orifice disposed for communicating the chamber with the inlet so that the chamber receives piloting liquid from the flow entering the body;
    a guide tube fixed to and projecting downwardly from said opposite end of the body and communicating with said pilot port,
    said guide tube having a discharge hole at a location spaced below the body for permitting piloting liquid to escape from the chamber into the tank via the pilot port, the guide tube, and the discharge hole; and
    a float buoyantly shiftable along and relative to said tube between a lower position uncovering said discharge hole when liquid within the tank is below a predetermined maximum level and an upwardly buoyed position covering said discharge hole when liquid reaches said predetermined maximum level,
    said float being adapted when in said upwardly buoyed position for causing piloting liquid pressure to increase in the chamber and shift the piston from the open position to the closed position,
    said piston having a hollow interior and an open lower end,
    said opposite end of the body including a riser projecting upwardly into the interior of the piston through said open lower end thereof.

5. An overfill prevention valve as claimed in claim 4, said pilot port being located in said riser.

6. An overfill prevention valve as claimed in claim 5,
    said piston having a conical nose facing in the upstream direction and an annular, integral skirt projecting downwardly from the lower extremity of said nose,
    said skirt surrounding said riser in radially spaced relation thereto.

7. An overfill prevention valve as claimed in claim 1,
    further comprising a coupling neck secured to said one end of the valve body and having an enlarged, internally threaded annular skirt adapted for attaching the neck to the externally threaded upper end of a fitting on a storage tank,
    said coupling neck having an internally threaded bore spaced radially inwardly from said skirt,
    said one end of the valve body being externally threaded and threadably received by said bore.

8. A liquid storage tank comprising:
    a top wall having a hole;
    an overfill prevention valve; and
    mounting structure mounting said valve on the tank in such a manner that the valve projects downwardly through said hole and into the tank,
    said valve comprising
        an elongated hollow valve body having an inlet at one end adapted for connection to a source of supply of liquid under pressure for filling the tank, at least one laterally disposed outlet downstream from said inlet for delivering liquid into the tank from the body, a valve seat between the inlet and the outlet, and a pilot port at an opposite end of the body;

a piston axially movable within said body between an open position wherein the piston is spaced away from said seat to permit incoming liquid to flow through the outlet and into the tank and a closed position wherein the piston is sealingly engaged with said seat to prevent liquid flow through the outlet and into the tank, said piston cooperating with said opposite end of the body to define an expandable actuating chamber that communicates with said pilot port, said piston having an orifice disposed for communicating the chamber with the inlet so that the chamber receives piloting liquid from the flow entering the body;

a guide tube fixed to and projecting downwardly from said opposite end of the body and communicating with said pilot port, said guide tube having a discharge hole at a location spaced below said body for permitting piloting liquid to escape from the chamber to the tank via the pilot port, the guide tube, and the discharge hole; and a float buoyantly shiftable along and relative to said tube between a lower position uncovering said discharge hole when liquid within the tank is below a predetermined maximum level and an upwardly buoyed position covering said discharge hole when liquid reaches said predetermined maximum level, said float being adapted when in said upwardly buoyed position for causing piloting liquid pressure to increase in the chamber and shift the piston from the open position to the closed position.

9. A liquid storage tank as claimed in claim 8, said piston having a generally tapered nose facing in the upstream direction, said nose being disposed to engage said seat when the piston is in the closed position and to direct liquid toward said outlet when the piston is in the open position.

10. A liquid storage tank as claimed in claim 9, said nose having an uppermost, central tip, said orifice being disposed at said tip.

11. A liquid storage tank comprising:

a top wall having a hole;

an overfill prevention valve; and mounting structure mounting said valve on the tank in such a manner that the valve projects downwardly through said hole and into the tank, said valve comprising an elongated hollow valve body having an inlet at one end adapted for connection to a source of supply of liquid under pressure for filling the tank, at least one laterally disposed outlet downstream from said inlet for delivering liquid into the tank from the body, a valve seat between the inlet and the outlet, and a pilot port at an opposite end of the body;

a piston axially movable within said body between an open position wherein the piston is spaced away from said seat to permit incoming liquid to flow through the outlet and into the tank and a closed position wherein the piston is sealingly engaged with said seat to prevent liquid flow through the outlet and into the tank, said piston cooperating with said opposite end of the body to define an expandable actuating chamber that communicates with said pilot port, said piston having an orifice disposed for communicating the chamber with the inlet so that the chamber receives piloting liquid from the flow entering the body;

a guide tube fixed to and projecting downwardly from said opposite end of the body and communicating with said pilot port, said guide tube having a discharge hole at a location spaced below said body for permitting piloting liquid to escape from the chamber to the tank via the pilot port, the guide tube, and the discharge hole; and a float buoyantly shiftable along and relative to said tube between a lower position uncovering said discharge hole when liquid within the tank is below a predetermined maximum level and an upwardly buoyed position covering said discharge hole when liquid reaches said predetermined maximum level, said float being adapted when in said upwardly buoyed position for causing piloting liquid pressure to increase in the chamber and shift the piston from the open position to the closed position, said piston having a hollow interior and an open lower end, said opposite end of the body including a riser projecting upwardly into the interior of the piston through said open lower end thereof.

12. A liquid storage tank as claimed in claim 11, said pilot port being located in said riser.

13. A liquid storage tank as claimed in claim 12, said piston having a conical nose facing in the upstream direction and an annular, integral skirt projecting downwardly from the lower extremity of said nose, said skirt surrounding said riser in radially spaced relation thereto.

14. A liquid storage tank as claimed in claim 8, said mounting structure including an annular flange on said top wall overlying and in axial alignment with said hole, said flange being internally threaded, said one end of the body being externally threaded and threadably engaged with said flange, said outlet being disposed below said flange.

15. A liquid storage tank as claimed in claim 14, said externally threaded one end of the body including a portion projecting upwardly through and beyond said flange, further comprising an internally threaded coupling neck threadably secured to said portion of the externally threaded one end of the body.

16. A liquid storage tank as claimed in claim 8, said mounting structure including a tubular fitting on said top wall projecting upwardly therefrom in axial alignment with said hole, said fitting having an externally threaded upper end, said mounting structure further including a coupling neck having an enlarged, internally threaded annular skirt threadably attaching the neck to the threaded upper end of the fitting, said coupling neck having an internally threaded bore spaced radially inwardly from said skirt, said one end of the valve body being externally threaded and threadably received by said bore to secure the body to the coupling neck, said outlet being disposed above said hole within said fitting.

* * * * *